(12) United States Patent
Asano et al.

(10) Patent No.: US 8,736,135 B2
(45) Date of Patent: May 27, 2014

(54) ARMATURE CORE

(75) Inventors: Yoshinari Asano, Shiga (JP); Nobuyuki Kifuji, Shiga (JP); Tomonori Kikuno, Osaka (JP); Shin Nakamasu, Shiga (JP); Ryuuji Yasumoto, Shiga (JP)

(73) Assignee: Daikin Industries, Ltd., Osaka (JP)

( * ) Notice: Subject to any disclaimer, the term of this patent is extended or adjusted under 35 U.S.C. 154(b) by 117 days.

(21) Appl. No.: 13/148,500

(22) PCT Filed: Feb. 24, 2010

(86) PCT No.: PCT/JP2010/052819
§ 371 (c)(1),
(2), (4) Date: Aug. 9, 2011

(87) PCT Pub. No.: WO2010/098336
PCT Pub. Date: Sep. 2, 2010

(65) Prior Publication Data
US 2011/0316381 A1    Dec. 29, 2011

(30) Foreign Application Priority Data

Feb. 26, 2009  (JP) ................. 2009-044845

(51) Int. Cl.
*H02K 1/16* (2006.01)
*H02K 1/06* (2006.01)

(52) U.S. Cl.
USPC ...... 310/216.058; 310/216.045; 310/216.057; 310/216.079; 310/254.1

(58) Field of Classification Search
CPC .................................. H02K 1/12; H02K 1/16
USPC ............. 310/216.058, 216.045, 216.057, 310/216.061, 216.062, 216.079–216.088, 310/216.015, 216.016, 216.004, 216.136, 310/254.1
See application file for complete search history.

(56) References Cited

U.S. PATENT DOCUMENTS

| | | | |
|---|---|---|---|
| 4,654,552 A * | 3/1987 | Fritzsche | 310/216.043 |
| 6,411,006 B2 * | 6/2002 | Suzuki et al. | 310/261.1 |
| 7,049,726 B2 * | 5/2006 | Nakahara et al. | 310/216.063 |
| 7,323,799 B2 | 1/2008 | Naito et al. | |
| 7,528,521 B2 | 5/2009 | Naitou et al. | |
| 7,642,682 B1 | 1/2010 | Matheny | |
| 2001/0005104 A1 * | 6/2001 | Nakahara et al. | 310/216 |
| 2004/0061396 A1 | 4/2004 | Narita et al. | |
| 2005/0028351 A1 * | 2/2005 | Reiter et al. | 29/598 |
| 2005/0067914 A1 * | 3/2005 | Baba et al. | 310/216 |

(Continued)

FOREIGN PATENT DOCUMENTS

| | | |
|---|---|---|
| EP | 1 450 463 A1 | 6/2004 |
| JP | 56-86843 U | 7/1981 |

(Continued)

OTHER PUBLICATIONS

Machine translation of of JP2009022147, Kitajima et al., Jan. 2009.*

*Primary Examiner* — Terrance Kenerly
(74) *Attorney, Agent, or Firm* — Birch, Stewart, Kolasch & Birch, LLP.

(57) ABSTRACT

Teeth are arranged annularly around a rotation axis. The yoke has through holes. The through holes open in a radial direction around the rotation axis and in an axial direction along the rotation axis. The teeth are inserted through the through holes. A metal plate is arranged to face the yoke in the axial direction. A reinforcing plate is fixed to the teeth.

14 Claims, 13 Drawing Sheets

(56) References Cited

U.S. PATENT DOCUMENTS

| | | |
|---|---|---|
| 2005/0073213 A1 | 4/2005 | Naito et al. |
| 2005/0254167 A1* | 11/2005 | Matsutani et al. ............ 360/119 |
| 2007/0018528 A1 | 1/2007 | Naitou et al. |
| 2007/0290567 A1 | 12/2007 | Adaniya et al. |

FOREIGN PATENT DOCUMENTS

| | | | | |
|---|---|---|---|---|
| JP | 2004-56860 A | 2/2004 | | |
| JP | 2006-333579 A | 12/2006 | | |
| JP | 2007-28854 A | 2/2007 | | |
| JP | 2007-28855 A | 2/2007 | | |
| JP | 2007-325362 A | 12/2007 | | |
| JP | 2008-245504 A | 10/2008 | | |
| JP | 2008245504 | * 10/2008 | ............ | H02K 15/02 |
| JP | 2009-22147 A | 1/2009 | | |
| JP | 2009022147 | * 1/2009 | ............... | H02K 1/18 |
| WO | WO 03/047069 A1 | 6/2003 | | |
| WO | WO 03/047070 A1 | 6/2003 | | |
| WO | WO 2009/078300 A1 | 6/2009 | | |

* cited by examiner

F I G. 2
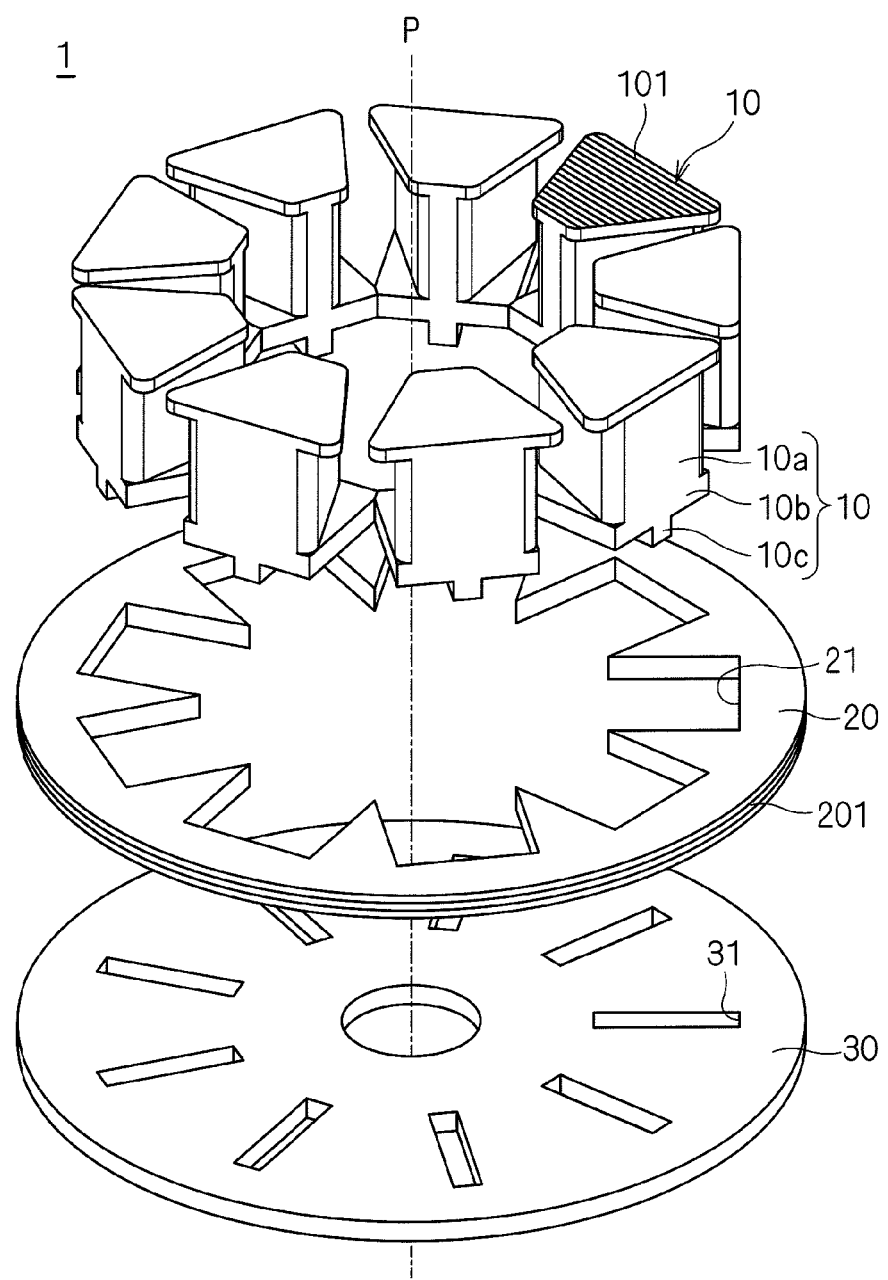

ARMATURE CORE

TECHNICAL FIELD

The present invention relates to an armature core.

BACKGROUND ART

Japanese Patent Application Laid-Open No. 2007-28855 discloses an armature. The armature has teeth, a yoke, and coils. The teeth are arranged annularly around an axis. The yoke has through holes allowing the teeth to be inserted therethrough in an axial direction. The coils are wound on the teeth. The through hole opens at the inner circumferential side in a radial direction. This reduces eddy currents occurring in the yoke due to magnetic fluxes flowing in the teeth in the axial direction.

In order to prevent the teeth from falling out of the yoke along the axial direction and to improve the strength of the armature, the teeth, the yoke, and the coils are integrally resin-molded. For the resin-molding, the teeth, the yoke, and the coils are accommodated in a predetermined die, and a resin is poured therein and cured. Note that as the documents related to the present application, there Patent Documents 2 and 3 are further given: Japanese Patent Application Laid-Open No. 2007-28854 and International Publication WO03/047069.

SUMMARY OF THE INVENTION

Problems to be Solved by the Invention

However, the invention disclosed in Japanese Patent Application Laid-Open No. 2007-28855 is difficult to use under a high-temperature ambient environment, because the teeth, the yoke, and the coils are integrally resin-molded. Moreover, in a usage environment in which the armature is in contact with a cooling medium, the resin may be melted (extracted) into the cooling medium.

Therefore, an object of the present invention is to provide an armature core that is easy to use even under a high-temperature ambient environment or under an ambient environment in which the armature core is in contact with a cooling medium.

Means for Solving the Problems

In a first aspect, an armature core of the present invention includes: a plurality of teeth (10) arranged annularly around a predetermined axis (P); a yoke (20) having a plurality of through holes (21) that open in a radial direction around the axis and an axial direction along the axis, and through which the plurality of teeth are inserted, the yoke (20) being formed of a plurality of magnetic steel sheets (201) stacked in the axial direction or formed of a dust core; and a metal plate (30) arranged to face the yoke (20) in the axial direction and fixed to the plurality of teeth (10).

In a second aspect, an armature core of the present invention is the armature core according to the first aspect, wherein each of the plurality of teeth (10) have a plurality of magnetic bodies (101) stacked in a direction perpendicular to the axis (P).

In a third aspect, an armature core of the present invention is the armature core according to the first or second aspect, wherein the metal plate (30) is non-magnetic.

In a fourth aspect, an armature core of the present invention is the armature core according to the third aspect, wherein the metal plate made of stainless steel.

In a fifth aspect, an armature core of the present invention is the armature core according to any one of the first to fourth aspects, wherein the plurality of teeth and the metal plate (30) are welded to each other, only at an end of the plurality of teeth (10) in the radial direction around the axis (P).

In a sixth aspect, an armature core of the present invention is the armature core according to any one of the first to fourth aspects, wherein at least one of the plurality of teeth (10) and the metal plate (30) are welded to each other over an entire circumference of the at least one of the plurality of teeth (10), when seen along the axis (P).

In a seventh aspect, an armature core of the present invention is the armature core according to any one of the first, third, and fourth aspects, wherein at least one of the plurality of teeth (10) has a plurality of magnetic plates (101) stacked in a direction perpendicular to the axis, and the at least one of the plurality of teeth and the metal plate (30) are welded at a portion to each other at a portion between adjacent two of the plurality of magnetic plates.

In an eighth aspect, an armature core of the present invention is the armature core according to any one of the first to seventh aspects, wherein at least one of the plurality of teeth (10) cooperates with said metal plate (30) to interpose the yoke (20) therebetween in said axial direction.

In a ninth aspect, an armature core of the present invention is the armature core according to any one of the first to eighth aspects, wherein: at least one of the plurality of teeth (10) has a plurality of magnetic bodies (101) stacked in a direction perpendicular to the axis (P); and the metal plate (30) has a hole (31) and a bias structure (33) provided at a periphery of the hole, said hole (31) allowing said at least one of said plurality of teeth to be insert therein in said axial direction, the bias structure (33) biasing the at least one of the plurality of teeth from outside to inside thereof in a direction of stacking of the plurality of magnetic bodies.

In a tenth aspect, an armature core of the present invention is the armature core according to any one of the first to ninth aspects, wherein: at least one of the plurality of teeth (10) has a recessed portion (11) that opens in a direction perpendicular to the axis (P); and the metal plate (30) has a hole (31) and a bias structure, said hole (31) allowing said at least one of said plurality of teeth to be inserted therein in said axial direction, the bias structure biasing the at least one of the plurality of teeth from outside to inside thereof in the direction to bring the at least one of the plurality of teeth into engagement with the recessed portion.

In an eleventh aspect, an armature core of the present invention is the armature core according to any one of the first, third, and fourth aspects, wherein the plurality of teeth (10) comprise dust cores containing insulating materials, the metal plate (30) is formed of a sintered metal, and the plurality of teeth and the metal plate are sinter-bonded to each other.

In a twelfth aspect, an armature core of the present invention is the armature core according to any one of the first to eleventh aspects, wherein an outer circumferential edge of the metal plate (30) is located at an outer side of the yoke when seen from the axis, and the metal plate is fixed to a predetermined casing (C10) from outside.

In a thirteenth aspect, an armature core of the present invention is the armature core according to any one of the first to twelfth aspects, wherein the metal plate (30) forms a part of a compressor mechanism (C44).

Effects of the Invention

According to the first aspect of the armature core of the present invention, an armature can be formed by winding coils on the teeth. A field element is arranged to the armature with a predetermined gap therebetween in the axial direction, and thereby a rotary electric machine can be formed. In the rotary electric machine, magnetic fluxes flow in the teeth along the axial direction. Due to the magnetic fluxes, a thrust force traveling along the axial direction acts on the teeth.

The through hole opening in the radial direction causes a deterioration in the strength of the yoke, and the yoke being formed of magnetic steel sheets or a dust core causes a deterioration in the strength as compared with being formed of a mass of iron and steel. However, since the teeth are fixed to the metal plate, an axial position of the teeth can be fixed independently of the strength of the yoke. This can suppress a shift of the teeth against the thrust force, not depending only on the strength of the yoke. Additionally, since the teeth are fixed to the metal plate, a use under a high-temperature ambient environment or a use in a compressor electric motor (for example, an air conditioner, a refrigerator, or the like) that is in contact with a cooling medium is easy.

According to the second aspect of the armature core of the present invention, eddy currents can be reduced which is caused by magnetic fluxes flowing within the teeth along the axial direction.

According to the third aspect of the armature core of the present invention, magnetic fluxes hardly flow in the metal plate, and therefore occurrence of an eddy current loss in the metal plate can be reduced.

According to the fourth aspect of the armature core of the present invention, stainless steel is adopted for the metal plate. The stainless steel has a high volume resistivity, and can reduce eddy currents that are caused by very small leakage of magnetic fluxes.

According to the fifth aspect of the armature core of the present invention, magnetic fluxes flowing in the teeth in the axial direction flow in the yoke along the circumferential direction. Even if heat generated by the welding is transferred through the metal plate to the yoke to consequently cause a thermal deformation of the yoke, the welding is performed so as to avoid a magnetic flux path so that a deterioration in the magnetic characteristics of the armature can be suppressed.

According to the sixth aspect of the armature core of the present invention, a fixing force for fixing the teeth and the metal plate to each other can be increased.

According to the seventh aspect of the armature core of the present invention, welding the teeth and the metal plate to each other also serves as fixing adjacent two of the plurality of magnetic plates to each other.

According to the eighth aspect of the armature core of the present invention, the fixing of the yoke can be implemented by the teeth and the metal plate.

According to the ninth aspect of the armature core of the present invention, a dimensional accuracy of the teeth in the direction of stacking of the magnetic bodies is poorer than a dimensional accuracy thereof in a direction perpendicular to the direction of stacking. Since the metal plate has a pressing member for pressing the teeth in the stacking direction, a dimensional error in the teeth in the stacking direction can be absorbed. This can improve a close-contact property between the teeth and the reinforcing plate, thus improving a fixing force for fixing the teeth and the reinforcing plate to each other.

According to the tenth aspect of the armature core of the present invention, a press structure of the metal plate and the recessed portion of the tooth are engaged with each other. This can prevent the tooth from escaping out of the metal plate in the axial direction.

According to the eleventh aspect of the armature core of the present invention, a dust core containing an insulating material is adopted for the teeth in order to reduce eddy currents, while a sintered metal is adopted for the metal plate, and they are integrally formed by sinter-bonding. Therefore, not only manufacturing of the teeth and the metal plate but also fixing of these members can be performed by means of a sintering apparatus.

According to the twelfth aspect of the armature core of the present invention, the metal plate is fixed to a casing, and therefore it is not necessary to fix the yoke to the casing when fixing the armature core to the casing. This makes it difficult that a stress occurs in the yoke due to fixing to the casing, thus hardly causing a deterioration in the magnetic characteristics of the yoke.

According to the thirteenth aspect of the armature core of the present invention, an armature can be formed by winding coils on the teeth. A field element is arranged to the armature with a predetermined gap therebetween in the axial direction, and thereby a rotary electric machine can be formed. In a usage of this rotary electric machine being mounted in a compressor, the metal plate forms a part of a compressor mechanism. Therefore, the number of component parts can be reduced, which contributes to a reduction in the manufacturing cost.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is an exploded perspective view showing a conceptual configuration of the armature core;

EMBODIMENT FOR CARRYING OUT THE INVENTION

First Embodiment

Figure 1:
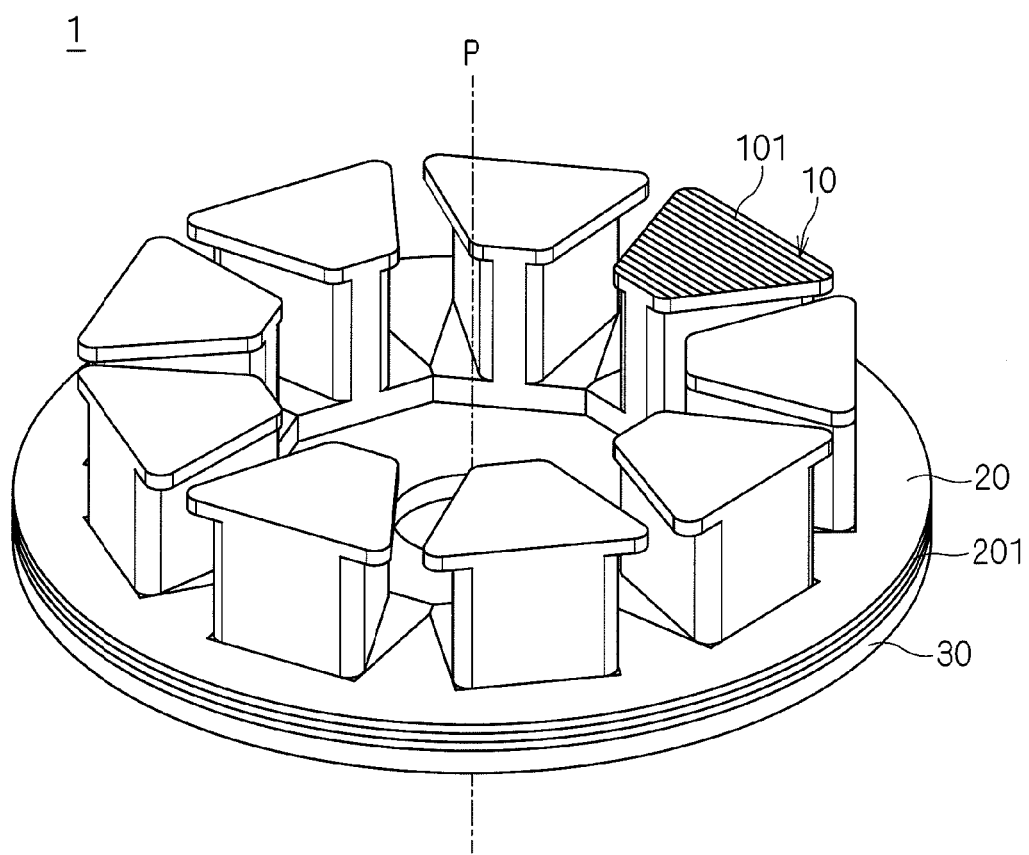
FIG. 1 is a perspective view showing a conceptual configuration of an armature core.

FIGS. 1 and 2 show an exemplary conceptual configuration of an armature core according to a first embodiment. FIG. 1 shows a perspective view of the armature core, and FIG. 2 shows component parts of the armature core being separated in an axial direction (hereinafter simply called an axial direction) extending along a rotation axis P. This armature core 1 includes a plurality of teeth 10, a yoke 20, and a reinforcing plate 30.

The plurality of teeth 10 are soft magnetic bodies (for example, iron), and arranged annularly around the rotation axis P. The yoke 20 is a soft magnetic body (for example, iron), and has a plurality of through holes 21 through which the plurality of teeth 10 are inserted in the axial direction, respectively. The yoke 20 magnetically couples the plurality of teeth 10 to one another in a circumferential direction. The teeth 10 extend from the yoke 20 to one side in the axial direction. Coils not shown are wound on the teeth 10 at the one side of the yoke 20 in the axial direction. A current flows in the coils, and thereby magnetic fluxes flow in the teeth 10 in the axial direction while magnetic fluxes flow in the yoke 20 in the circumferential direction.

In the example shown in FIGS. 1 and 2, the teeth 10 are formed of magnetic steel sheets 101 being stacked in a radial direction (hereinafter simply called a radial direction) around the rotation axis P at positions thereof. In FIGS. 1 and 2, only an upper surface of the magnetic steel sheets 101 included in one tooth 10 is shown, and the magnetic steel sheets included in the other teeth 10 are not shown. In the drawings, for the sake of convenience, each one of the magnetic steel sheets 101 has a relatively large thickness in the radial direction. For example, in FIG. 1, the number of magnetic steel sheets 101 stacked in the tooth 10 is about several tens, which is simplified. Actually, more magnetic steel sheets 101 may be stacked. The same applies to other drawings, and applies not only to the teeth 10 but also to other component elements formed of magnetic steel sheets.

Unlike the example shown in FIGS. 1 and 2, the teeth 10 may be formed of magnetic steel sheet 101 being stacked in a circumferential direction (hereinafter simply called a circumferential direction) around the rotation axis P at positions thereof. In either case, if the tooth 10 is formed of magnetic steel sheets 101 being stacked in a direction perpendicular to the rotation axis P, eddy currents occurring in the tooth 10 due to magnetic fluxes flowing in the tooth 10 in the axial direction can be reduced.

The tooth 10 is not necessarily formed of the magnetic steel sheets 101, but may be a dust core, for example. Since an insulating material (such as a resin) is intentionally contained in the dust core during molding, the dust core has a high electrical resistance. This reduces eddy currents.

The through hole 21 opens at the rotation axis P side (hereinafter also called an inner circumferential side) or the side (hereinafter also called an outer circumferential side) opposite to the rotation axis P in the radial direction. This can suppress eddy currents occurring in the yoke 20 around the teeth 10 when seen in the axial direction, which is caused by magnetic fluxes flowing in the teeth 10 along the axial direction. In the example shown in FIGS. 1 and 2, the through hole 21 opens at the inner circumferential side.

In the example shown in FIGS. 1 and 2, the yoke 20 is formed of magnetic steel sheets 201 being stacked in the axial direction. This can reduce eddy currents occurring in the yoke 20 due to magnetic fluxes flowing in the yoke 20 in the circumferential direction. However, this is not essential, and for example, the yoke 20 may be formed of a dust core.

The reinforcing plate 30 is made of a metal (such as iron, stainless steel, or aluminum) The reinforcing plate 30 has a plate-like shape, for example, and is arranged so as to face the yoke 20 at the other side (the side opposite to the coil side) in the axial direction. The teeth 10 and the reinforcing plate 30 are metallurgically or mechanically fixed to each other. Even though the yoke 20 is formed of the magnetic steel sheets 201 being stacked in the axial direction, an adequate strength can be provided to the armature core 1 by sufficiently increasing the thickness of each one of the magnetic steel sheets 201 to thereby increase the thickness of the reinforcing plate 30. Moreover, unlike the yoke 20 being formed of a dust core made of insulated fine iron powder, the reinforcing plate 30 has a strength of a metal. The yoke 20 and the reinforcing plate 30 may be fixed to each other by welding, bonding, or the like, or alternatively may not be fixed to each other.

The reinforcing plate 30 is not expected to function as a magnetic path connecting the teeth 10 in the circumferential direction. The magnetic path is implemented by the yoke 20. This feature can be achieved by, for example, adjusting the thickness of the yoke 20 in the axial direction. Since the reinforcing plate 30 does not need to function as a magnetic path, it is not necessary to adopt a material and a structure (for example, a magnetic steel sheet or a dust core) for the purpose of reducing eddy currents, and the reinforcing plate 30 can be formed of an inexpensive metal. In order that no magnetic flux can pass through the reinforcing plate 30, the reinforcing plate 30 may be formed of a non-magnetic metal (such as stainless steel or aluminum). The reinforcing plate 30 formed of a non-magnetic metal can prevent leakage of magnetic fluxes to the reinforcing plate 30, and can reduce an eddy current loss within the reinforcing plate 30, though a material and a structure of the reinforcing plate 30 are not for the purpose of reducing eddy currents. Desirably, the reinforcing plate 30 is formed of stainless steel. Stainless steel has a higher volume resistivity than aluminum, and is suitable for reducing eddy currents that are caused by very small leakage of magnetic fluxes.

In this armature core 1, coils not shown are wound on the teeth 10, and thus an armature is formed. A field element not shown is arranged to the armature with a predetermined interval therebetween in the axial direction, thus forming a rotary electric machine. In the rotary electric machine, magnetic fluxes flow in the teeth 10 along the axial direction. A thrust force acts on the teeth 10 along the axial direction due to the magnetic fluxes.

As described above, the through hole 21 opens in the radial direction. This can suppress eddy currents occurring in the yoke 20, but the through hole 21 opening in the radial direction causes a deterioration in the strength of the yoke 20. The yoke 20 formed of the magnetic steel sheets 201 or the dust core causes a deterioration in the strength, as compared with the yoke 20 being formed of a mass of iron and steel. However, the teeth 10 are fixed to the reinforcing plate 30, and therefore the position of the teeth 10 with respect to the axial direction can be fixed independently of the strength of the yoke 20. Desirably, the cross-sectional area of a hole 31 of the reinforcing plate 30 which will be described later is smaller than the cross-sectional area of the through hole 21 of the yoke 20. This can further enhance the strength of the reinforcing plate 30. Therefore, even if a sufficient strength is not obtained by the yoke 20 alone, an oscillation and an escape of the teeth 10 due to the thrust force can be suppressed. Moreover, since a metal is adopted for the reinforcing plate 30, a use under a high-temperature ambient environment or a use in a hermetic-compressor electric motor (for example, an air conditioner, a refrigerator, or the like) in contact with a cooling medium is easy.

For example, to ensure the strength by means of resin-molding, it is necessary that the armature core 1 and the coils not shown are entirely covered with a resin. In this embodiment, a metal having a higher strength than a resin is adopted for the reinforcing plate 30, and therefore the strength can be ensured merely by providing the reinforcing plate 30 only at the side of the yoke 20 opposite to the teeth 10 side. Moreover, only fixing the teeth 10 and the reinforcing plate 30 to each other suffices. Thus, as compared with a case where the armature core 1 and the coils are entirely resin-molded, an influence of pressure and the like acting on the armature core 1 and the coils can be limited to a part (near regions where the teeth 10 and the reinforcing plate 30 are fixed to each other) of the armature core 1. In addition, the fixing strength can be stably maintained above a certain level. In a case of resin-molding, a resin functions as a reinforcing member for maintaining the strength. In the armature core 1, on the other hand, a metal functions as a reinforcing member, and therefore the thickness of the reinforcing member can be reduced.

Next, a specific example of fixing the teeth 10 and the reinforcing plate 30 to each other will be described. For example, the teeth 10 and the reinforcing plate 30 are metallurgically fixed to each other by, for example, welding. In the example shown in FIG. 2, the reinforcing plate 30 has the holes 31 through which the teeth 10 are inserted in the axial direction. The holes 31 are formed through the reinforcing plate 30 in the axial direction. In a cross-section perpendicular to the rotation axis P, the hole 31 has, for example, an elongated shape whose long side extends along the radial direction.

Figure 3:
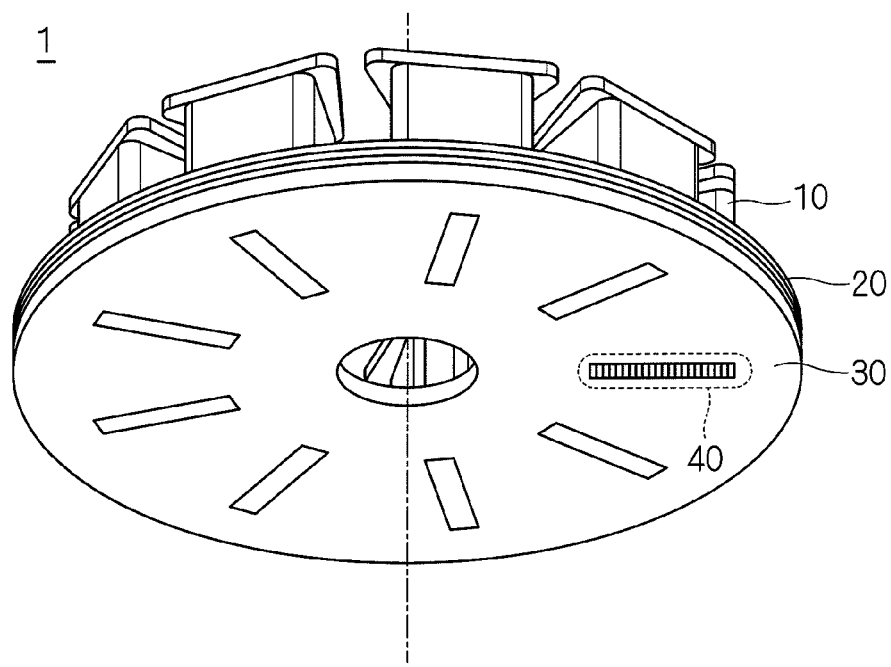
FIG. 3 is a perspective view showing a conceptual configuration of the armature core.

The teeth 10 are arranged so as to penetrate the yoke 20 and the reinforcing plate 30 in the axial direction through the through holes 21 and the holes 31. FIG. 3 is a conceptual perspective view of the armature core 1 when seen from the reinforcing plate 30 side. The teeth 10 and the reinforcing plate 30 are fixed to each other by welding from the other side (the side opposite to the coils) in the axial direction. In the example shown in FIG. 3, the tooth 10 and the reinforcing plate 30 are welded to each other in an externally exposed portion (a weld portion 40 in FIG. 3) at a boundary between an axial end of the tooth 10 and the hole 31 adjacent to each other. Welding between the teeth 10 and the reinforcing plate 30 does not hinder the use under a high-temperature ambient environment and the use in a state of being in contact with a cooling medium.

This welding is achieved by an arbitrary welding method, and examples thereof include gas welding, arc welding, electroslag welding, electron beam welding, laser welding, resistance welding, forge welding/friction pressure welding/explosive welding, and brazing/soldering. In particular, the laser welding is preferable because of a small amount of heat input, a small swelling resulting from the welding, and a small diameter of the welding. Plasma arc welding is preferable because it provides precise welding. In a case where the teeth 10 and the reinforcing plate 30 are fixed to each other by welding, it is desirable that the reinforcing plate 30 is formed of an iron material or non-magnetic stainless steel that is easy to weld. The teeth 10 including the stacked magnetic steel sheets 101 are suitable to be welded to the reinforcing plate 30.

In this armature core 1, coils not shown are wound on the teeth 10, and thus an armature is formed. This armature can be assembled through, for example, the following procedure. Firstly, the coil is wound on each of the plurality of teeth 10. At this time, for example, an insulating paper or the like is wrapped between the teeth 10 and the coils. It is for the electrical insulation of the coils from the teeth 10 to thereby prevent a short circuit through the teeth. Then, the teeth 10 having the coils wound thereon are inserted through the through holes 21, thus placing the yoke 20. Then, the reinforcing plate 30 is opposed to the yoke 20 in the axial direction from the side opposite to the coils, and the teeth 10 are inserted through the holes 31, thus placing the reinforcing plate 30. Then, the teeth 10 and the reinforcing plate 30 are fixed to each other by welding.

In this procedure, the coils are wound prior to mounting the teeth 10 to the yoke 20 or the reinforcing plate 30, and therefore it is easy to wind with a high space factor. Additionally, in this procedure, after the teeth 10 are arranged on the yoke 20, the reinforcing plate 30 is placed. Therefore, the yoke 20 may be integral in the circumferential direction, or may be divided in the circumferential direction. Either shape is usable.

However, the procedure is not necessarily limited thereto. Assuming that fixing the teeth 10 and the reinforcing plate 30 to each other, winding the coils on the teeth 10, and assembling the teeth 10 and the yoke 20 to each other are defined as a first step, a second step, and a third step, respectively, any of the following procedures is adoptable. For example, the assembling may be performed in the order of the third step, the first step, and the second step. For example, the assembling may be performed in the order of the first step, the third step, and the second step. In these cases, the first step of welding is performed prior to the second step of winding the coils. Therefore, the armature can be assembled without transferring heat caused by the welding to the coils. For example, the assembling may be performed in the order of the third step, the second step, and the first step. However, in a case of performing the first step and the second step prior to the third step, it is necessary to divide the yoke 20 in the circumferential direction and insert it between the reinforcing plate 30 and the coils from the inner circumferential side or the outer circumferential side.

Figure 4:
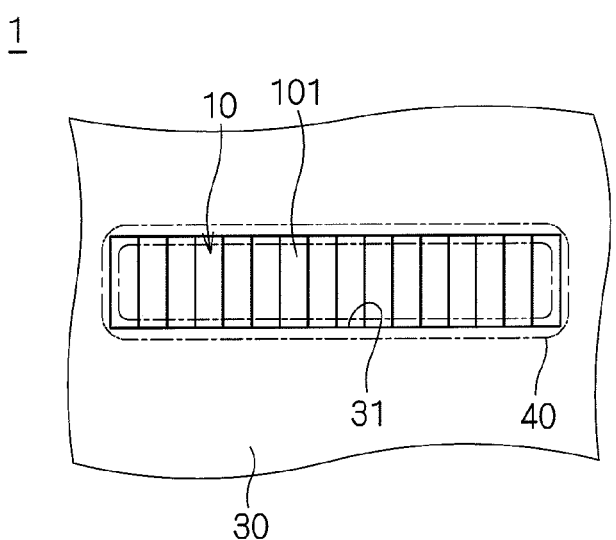
FIG. 4 is a diagram showing an example of a weld portion where a tooth and a reinforcing plate are welded to each other.
Figure 5:
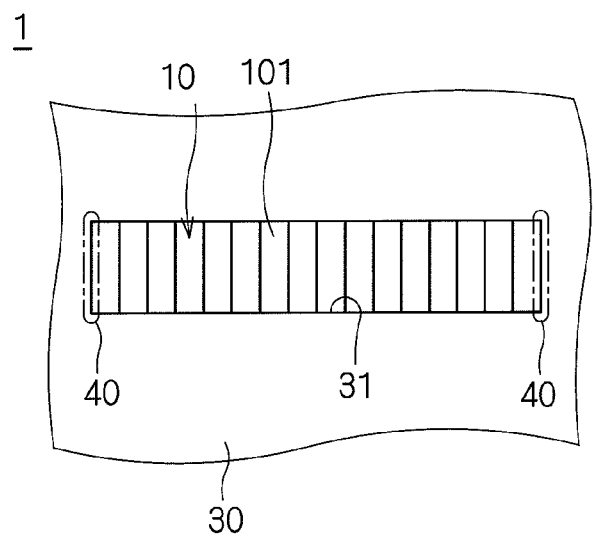
FIG. 5 is a diagram showing an example of the weld portion where the tooth and the reinforcing plate are welded to each other.
Figure 6:
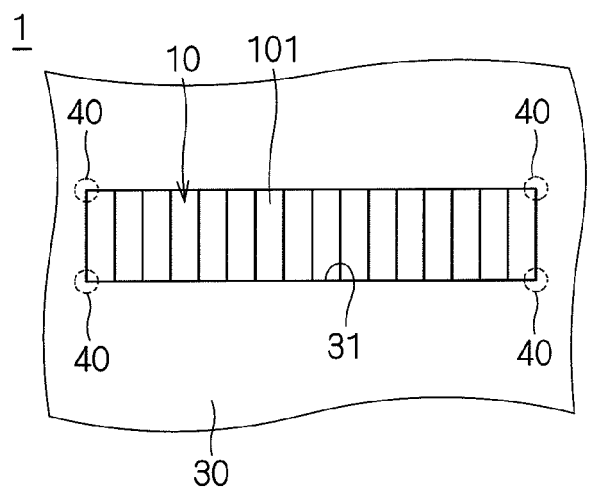
FIG. 6 is a diagram showing an example of the weld portion where the tooth and the reinforcing plate are welded to each other.

FIGS. 4 to 6 are diagrams showing examples of the weld portion between the tooth and the reinforcing plate. In FIGS. 4 to 6, in a plane viewed from the other side in the axial direction, a part corresponding to one of the teeth 10 of the armature core 1 is shown.

In the example shown in FIG. 4, the tooth 10 and the reinforcing plate 30 are welded to each other over the entire circumference of the tooth 10, when seen from the other side in the axial direction. In the weld portion 40, a fixing force for fixing the tooth 10 to the reinforcing plate 30 is relatively strong. In the weld portion 40, the tooth 10 and the reinforcing plate 30 are welded to each other along the direction of stacking of the magnetic steel sheets 101. In other words, the tooth 10 and the reinforcing plate 30 are welded to each other at portions between ones of the magnetic steel sheets 101. Therefore, fixing the magnetic steel sheets 101 to one another and fixing the tooth 10 to the reinforcing plate 30 can be achieved by the welding in the weld portion 40. From the viewpoint of fixing the magnetic steel sheets 101 to one another, it is not necessary that the welding extends over the entire circumference of the tooth 10, and in essence, it suffices that the tooth 10 and the reinforcing plate 30 are welded to each other at portions between ones of the magnetic steel sheets 101. The welding may not necessarily be continuous, and spot-welding may be performed at spots along the entire circumference where surfaces of the magnetic steel sheets 101 included in the tooth 10 are in contact with each other.

Here, in the weld portion 40 shown in FIG. 4, the welding is performed also at a circumferential end of the tooth 10. Welding causes a thermal strain in the tooth 10 and the reinforcing plate 30. It can be considered that, if the thermal strain occurs also at the yoke 20 side (and more specifically near a boundary between the tooth 10 and the yoke 20 in the circumferential direction), magnetic characteristics may be deteriorated near the boundary between the tooth 10 and the yoke 20 in the circumferential direction. Such a deterioration in the magnetic characteristics is not preferable, because a region near the boundary between the tooth 10 and the yoke 20 in the circumferential direction forms a magnetic flux path.

In the example shown in FIG. 5, the tooth 10 and the reinforcing plate 30 are welded to each other at both radial ends of the tooth 10. In other words, the tooth 10 and the reinforcing plate 30 are welded to each other in an inner circumferential side part and an outer circumferential side part of the boundary between the tooth 10 and the reinforcing plate 30, and the teeth 10 and the reinforcing plate 30 are not welded to each other near a circumferential part of the boundary between the tooth 10 and the reinforcing plate 30. In this weld portion 40, even if a thermal strain due to the welding occurs also at the yoke 20 side, a deterioration in the magnetic characteristics is not likely to occur near the circumferential part of the boundary between the tooth 10 and the yoke 20.

In the example shown in FIG. 6, the tooth 10 and the reinforcing plate 30 are welded to each other at the four corners (the four corners of the hole 31) of the tooth 10, when seen from the other side in the axial direction. In this weld portion 40, the tooth 10 and the reinforcing plate 30 can be welded to each other with a relatively small weld portion. Since the welding is not applied near a circumferential part of the boundary between the tooth 10 and the reinforcing plate 30; even if a thermal strain due to the welding occurs also at the yoke 20 side, a deterioration in the magnetic characteristics is not likely to occur near the circumferential part of the boundary between the tooth 10 and the yoke 20. Additionally, since the four corners of the tooth 10 are fixed, the position of the tooth 10 is uniquely determined.

Figure 7:
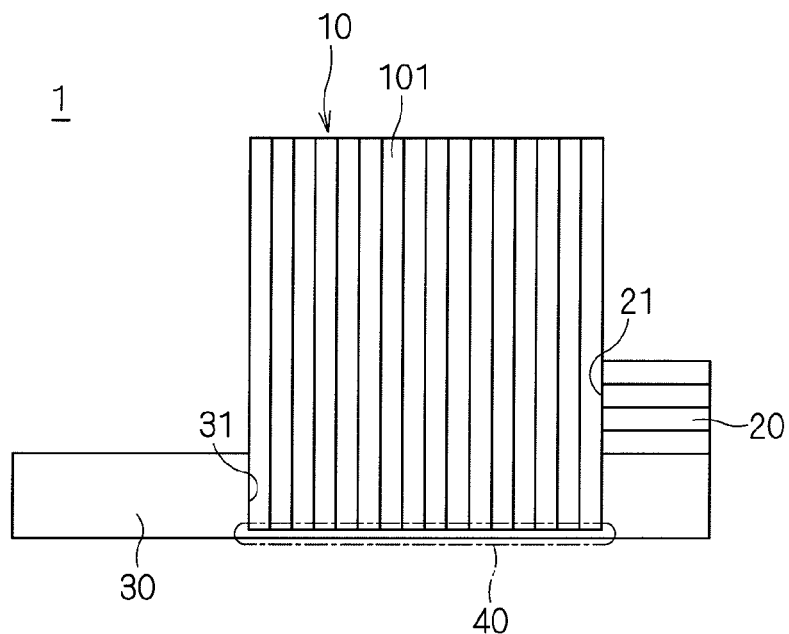
FIG. 7 is a diagram showing a conceptual configuration of a part of the armature core in a cross-section along a radial direction.

FIG. 7 shows another exemplary conceptual configuration of the armature core, in a cross-section passing through the tooth and extending along the radial direction. In the example shown in FIG. 7, the hole 31 is not formed through the reinforcing plate 30. The hole 31 opens at the yoke 20 side in the axial direction. The tooth 10 is inserted into the hole 31 along the axial direction, and one axial end of the tooth 10 is brought into contact with a bottom surface of the hole 31. In this armature core 1, the tooth 10 and the reinforcing plate 30 are welded to each other in the weld portion 40 where the one axial end of the tooth 10 is in contact with the bottom surface of the hole 31. This welding can be achieve by, in the weld portion 40, melting the reinforcing plate 30 from the other side thereof in the axial direction through, for example, laser welding. In the position where the hole 31 exists, the axial thickness of the reinforcing plate 30 is selected such that it can be sufficiently smaller than the thickness that hinders the laser welding.

Figure 8:
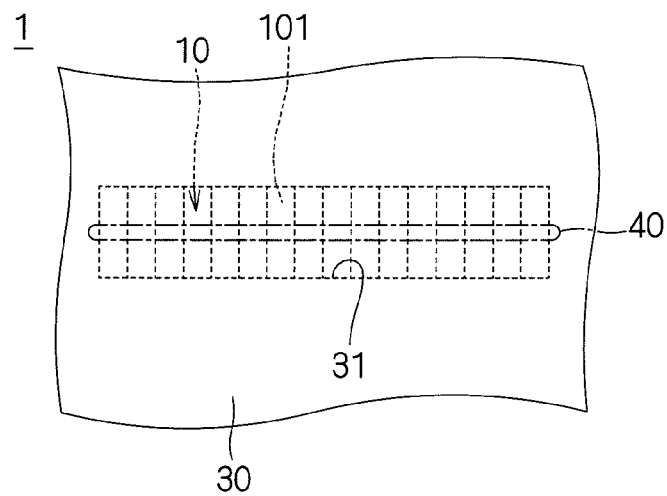
FIG. 8 is a diagram showing a conceptual configuration of a part of the armature core, when seen along an axial direction.

FIG. 8 is a plan view of the armature core of FIG. 7, as seen from the other side in the axial direction. The tooth 10 and the reinforcing plate 30 are welded to each other along the stacking direction in the tooth 10. In other words, the tooth 10 and the reinforcing plate 30 are welded to each other at portions between ones of the magnetic steel sheets 101. Therefore, fixing the magnetic steel sheets 101 to one another can also be achieved. In the example shown in FIG. 8, the tooth 10 and the reinforcing plate 30 are welded to each other at the center of the tooth 10 with respect to the circumferential direction. The magnetic fluxes flowing in the tooth 10 in the axial direction is, at a position where it comes into contact with the yoke 20, caused to flow in two opposite directions of the circumferential direction. That is, in a portion of the tooth 10 embedded in the yoke 20, the amount of magnetic fluxes flowing in the circumferential center of the tooth 10 is small at the reinforcing plate 30 side. Accordingly, even if a thermal strain due to the welding occurs also in the portion of the tooth 10 embedded in the yoke 20, a deterioration in the magnetic characteristics due to the weld portion 40 is not likely to occur.

Here, in the tooth 10, a portion where the coil is wound is called a coil winding portion 10a, a portion embedded in the yoke 10 is called an embedded-in-yoke portion 10b, and a portion embedded in the reinforcing plate 30 is called an embedded-in-reinforcing-plate portion 10c.

In the example shown in FIGS. 1 to 3, when seen in the axial direction, a coil winding portion 10a has a substantially trapezoidal shape, while the embedded-in-yoke portion 10b and the embedded-in-reinforcing-plate portion 10c have elongated shapes.

The plurality of teeth 10 are arranged such that the trapezoidal shape of the coil winding portion 10a can have its upper base (<lower base) facing the rotation axis P side. This can increase the ratio of the area occupied by the coil to the area between the teeth 10 adjacent to each other in the circumferential direction when seen in the axial direction. This contributes to downsizing or increased efficiency of the armature.

Each of the embedded-in-yoke portion 10b and the through hole 21 of the yoke 20 has an elongated shape when seen in the axial direction. In a case where the teeth 10 are formed of the magnetic steel sheets 101, a dimensional accuracy of the teeth 10 is relatively good in a direction (here, the circumferential direction) perpendicular to the stacking direction. Moreover, since the embedded-in-yoke portion 10b has an elongated shape, no step occurs. Therefore, even if there is a dimensional error in the length of the teeth 10 in the stacking direction, a gap between the teeth 10 and the yoke 20 in the circumferential direction can be reduced. This enables magnetic fluxes to successfully flow from the teeth 10 to the yoke 20.

Figure 9:
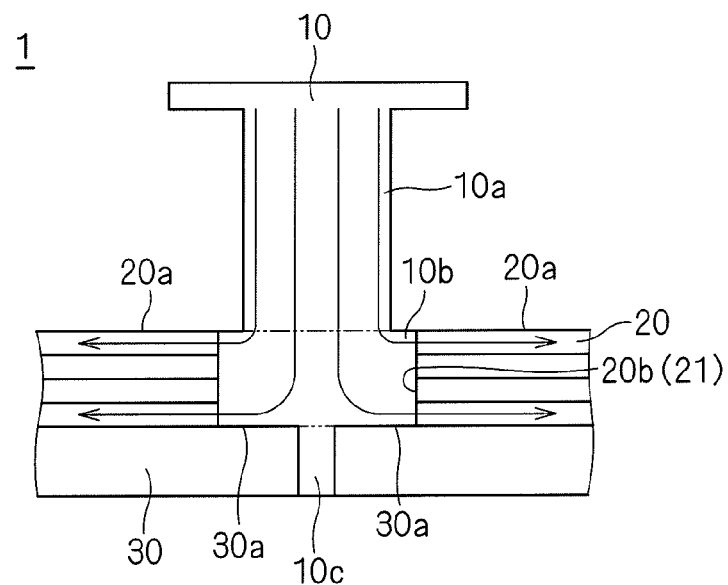
FIG. 9 is a circumferential cross-sectional view showing a conceptual configuration of a part of the armature core.

FIG. 9 shows a circumferential cross-section of the armature core of FIGS. 1 to 3 sectioned at the position passing through the tooth. The width of the embedded-in-reinforcing-plate portion 10c in the circumferential direction is smaller than the widths of the coil winding portion 10a and the embedded-in-yoke portion 10b in the circumferential direction. The embedded-in-reinforcing-plate portion 10c is located at the center of the tooth 10 in the circumferential direction. As a result, at both sides of the tooth 10 in the circumferential direction, a boundary 30a between the reinforcing plate 30 and the tooth 10 is formed perpendicularly to the axial direction. In this structure, the magnetic fluxes flowing in the tooth 10 in the axial direction are brought to flow toward the yoke 20 rather than toward the reinforcing plate 30. This is because, while the magnetic fluxes flowing in the tooth 10 in the axial direction then flow in the yoke 20 in two opposite directions of the circumferential direction (arrows in FIG. 9), the boundary 30a functions as a magnetic barrier in the axial direction at both circumferential sides of the tooth 10. The presence of the boundary 30a makes it difficult that the magnetic fluxes flow out of the boundary 30a into the reinforcing plate 30. Thus, the magnetic fluxes are likely to flow along the boundary 30a to the yoke 20 side.

The yoke 20 is formed of the magnetic steel sheets 201 stacked in the axial direction. The magnetic steel sheet 201 is formed by punching a predetermined magnetic steel sheet into the shape of the yoke 20 in the axial direction. Although a magnetic steel sheet is normally surface-treated, no surface treatment is applied to a portion punched in the axial direction (a surface 20b extending along the axial direction). Such a surface treatment increases a magnetic resistance. That is, in the yoke 20, a magnetic resistance in the surface 20a perpendicular to the axial direction is smaller than a magnetic resistance in the surface 20b extending along the axial direction.

The width of the coil winding portion 10a in the circumferential direction is equal to or smaller than the width of the embedded-in-yoke portion 10b in the circumferential direction. As a result, the magnetic fluxes flowing from the tooth 10 to the yoke 20 flow while crossing the surface 20b of the yoke 20 extending along the axial direction having a smaller magnetic resistance without crossing the surface 20a perpendicular to the axial direction. Therefore, the flow of the magnetic fluxes is hardly hindered.

Figure 10:
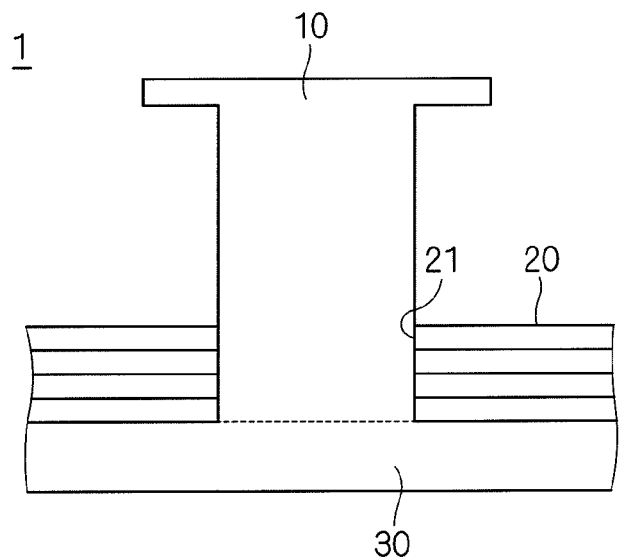
FIG. 10 is a circumferential view showing a conceptual configuration of a part of the armature core.

Although in this first embodiment, the welding is described as an example of metallurgical fixing, this is not limitative. For example, the teeth 10 and the reinforcing plate 30 may be fixed to each other by sinter-bonding. FIG. 10 shows an exemplary conceptual configuration of the armature core, in a cross-section passing through the tooth and extending along the circumferential direction.

The tooth 10 is formed of a dust core obtained by shaping a mixture of a powdered metal (such as iron) and an insulating material (such as a resin). The reinforcing plate 30 is made of a sintered metal obtained by sintering and shaping a powdered metal (such as iron or stainless steel). The teeth 10 and the reinforcing plate 30 are fixed to each other by sinter-bonding. This sinter-bonding also does not hinder the use under a high-temperature ambient environment and the use in a state of being in contact with a cooling medium.

Second Embodiment

Figure 11:
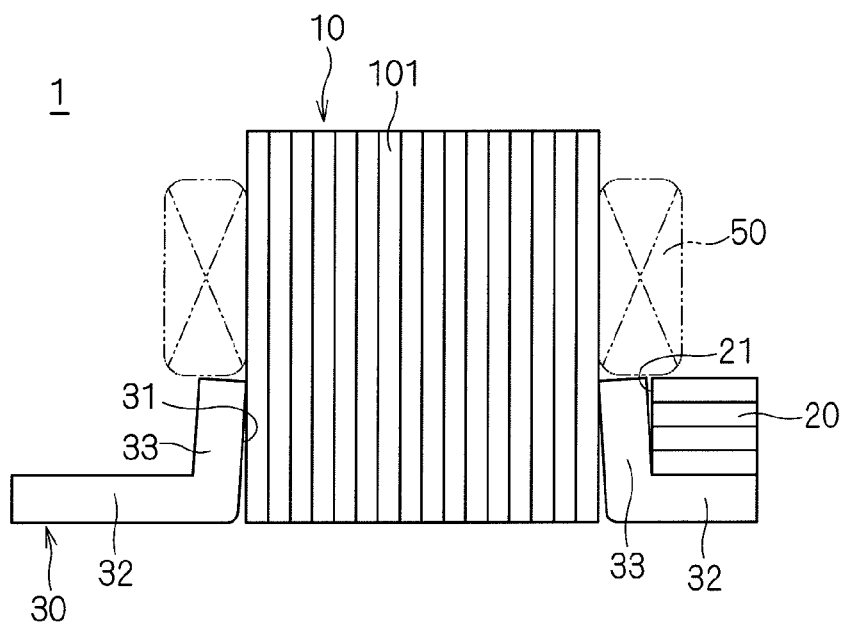
FIG. 11 is a radial view showing a conceptual configuration of a part of the armature core.

In a second embodiment, mechanical fixing will be described, while metallurgical fixing has been described as an example of the fixing in the first embodiment. A perspective view showing an exemplary conceptual configuration of an armature core according to the second embodiment is identical to that shown in FIG. 1. FIG. 11 shows an exemplary conceptual configuration of the armature core, in a cross-section passing through the tooth and extending along the radial direction. In FIG. 11, a coil 50 wound on the tooth 10 is illustrated with alternate long and two short dashes lines.

The tooth 10 and the reinforcing plate 30 are fixed to each other by interference-fitting (for example, press-fitting, shrink-fitting, cool-fitting, or the like). By such fitting, the tooth 10 is fixed to the reinforcing plate 30 similarly to the first embodiment, and therefore the axial position of the tooth 10 can be fixed independently of the strength of the yoke 20. Thus, even if a sufficient strength is not obtained only by the yoke 20, a shift of the tooth 10 can be suppressed against the thrust force. Moreover, since the tooth 10 and the metal reinforcing plate 30 are mechanically fixed to each other, the use under a high-temperature ambient environment or the use in a hermetic-compressor electric motor (for example, an air conditioner, a refrigerator, or the like) in contact with a cooling medium is easy.

In the example shown in FIG. 11, the tooth 10 is formed of the magnetic steel sheets 101. In the reinforcing plate 30, a bias structure for biasing the tooth 10 from outside to inside in the stacking direction (here, the radial direction) is provided. As a result, the magnetic steel sheets 101 are pressed, and thus a dimensional error in the tooth 10 in the stacking direction can be absorbed, thereby improving a contact property between the tooth 10 and the reinforcing plate 30. Therefore, a fixing force due to the interference fitting can be improved.

In a more specific example, the reinforcing plate 30 includes a member 32 facing the yoke 20 in the axial direction, and a member 33 bent from the member 32 and extending in the axial direction. The member 33 is interposed between the tooth 10 and the yoke 20 in the direction of stacking of the magnetic steel sheets 101. The member 33 is inclined so as to be closer to the tooth 10 at a position more distant from the member 32. For example, the member 33 can be recognized simply as a beam having one end thereof fixed at the member 32 side. Due to the presence of the tooth 10, the member 33 (beam) is deformed toward the member 32, to press the tooth 10 in the stacking direction because of this elastic deformation. Such a shape of the reinforcing plate 30 can be easily achieved by, for example, casting, sintering, and spinning.

Figure 12:
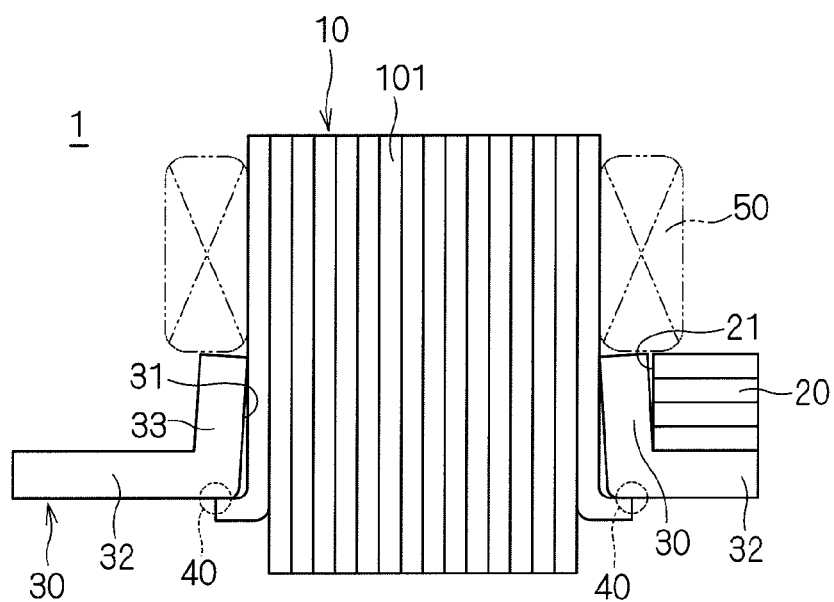
FIG. 12 is a radial view showing a conceptual configuration of a part of the armature core.

FIG. 12 shows another conceptual example of an armature core in a cross-section passing through the tooth and extending along the radial direction. As compared with the armature core shown in FIG. 11, the tooth 10 and the reinforcing plate 30 are fixed to each other by interference fitting, and also fixed to each other by welding.

In the example shown in FIG. 11, the member 33 is inclined to the tooth 10 side while extending from the member 32 to one side (coil 50 side) in the axial direction. As a result, a gap is formed between the tooth 10 and the reinforcing plate 30 at the other side (the side opposite to the coil 50) in the axial direction. Therefore, it may be difficult to weld the tooth 10 and the reinforcing plate 30 from the other side in the axial direction. Of course, welding may be performed from one side in the axial direction. However, if the tooth 10 is inserted into the hole 31 of the reinforcing plate 30 after the coil 50 is wound on the tooth 10, the coil 50 hinders welding of the tooth 10 and the reinforcing plate 30 from the one side in the axial direction. In such a case, welding from the other side in the axial direction is required.

Thus, in the example shown in FIG. 12, the magnetic steel sheet 101 located at each end in the stacking direction is bent along the reinforcing plate 30 at the other side in the axial direction. Welding is performed in the weld portion 40 at which the magnetic steel sheet 101 and the reinforcing plate 30 are positioned close to each other. Since the magnetic steel sheet 101 is bent to extend along the reinforcing plate 30, a gap between the magnetic steel sheet 101 and the reinforcing plate 30 can be made small, and therefore the welding thereof is easy.

The bent magnetic steel sheet 101 is in contact with the reinforcing plate 30 (and more specifically the member 33) in the axial direction. As a result, the tooth 10 is locked to the reinforcing plate 30 in the axial direction. This can further suppress a shift of the tooth 10 to the one side in the axial direction.

Figure 13:
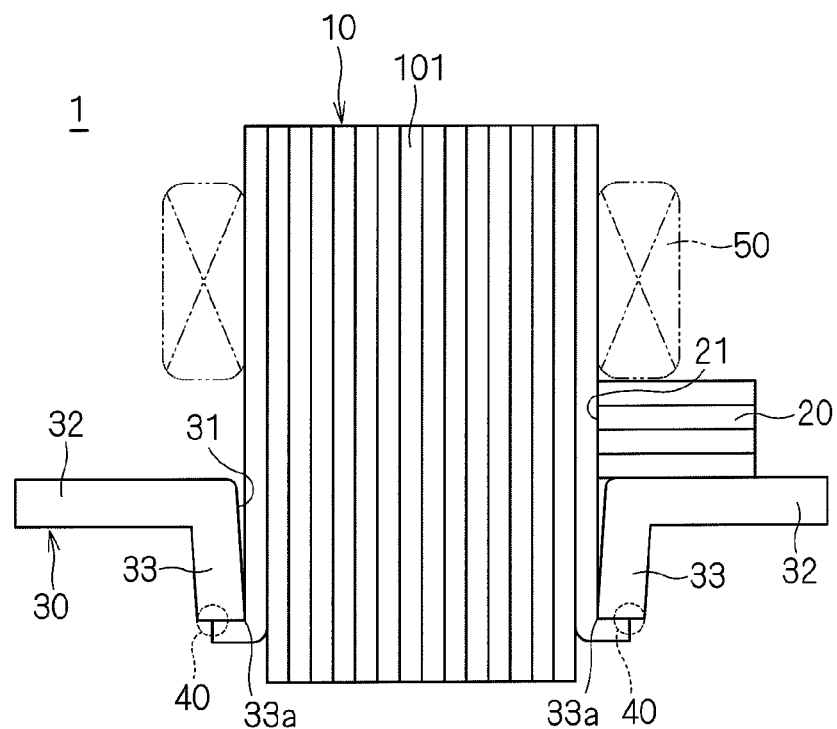
FIG. 13 is a radial view showing a conceptual configuration of a part of the armature core.

FIG. 13 shows another conceptual example of an armature core in a cross-section passing through the tooth and extending along the radial direction. In the example shown in FIG. 13, the tooth 10 and the reinforcing plate 30 are fixed to each other by interference fitting, and also fixed to each other by welding. However, as compared with the armature core shown in FIG. 12, the member 33 extends from the member 32 to the other side in the axial direction. The member 33 is inclined so as to be closer to the tooth 10 at a position more distant from the member 32. This provides a high contact property of the tooth 10 and the reinforcing plate 30 at the other side in the axial direction. Therefore, welding can be easily performed from the other side. In FIG. 13, the welding is not performed at a corner 33a of the member 33 closest to the tooth 10. Similarly to FIG. 12, the magnetic steel sheet 101 located at each end in the stacking direction is bent to the member 33 side, and the bent magnetic steel sheet 101 and the member 33 are welded. This can further suppress a shift of the tooth 10 to the one side in the axial direction.

The member 33 is not interposed between the tooth 10 and the yoke 20. This is preferable when the tooth 10 is formed of magnetic steel sheets stacked in the circumferential direction. In a case where the magnetic steel sheets 101 are stacked in the circumferential direction, a press structure of the reinforcing plate 30 presses the tooth 10 in the circumferential direction. Therefore, according to the examples shown in FIGS. 11 and 12, the member 33 is interposed between the tooth 10 and the yoke 20 in the circumferential direction. This hinders the flow of the magnetic fluxes from the tooth 10 to the yoke 20 in the circumferential direction. On the other hand, according to the example shown in FIG. 13, the member 33 and the tooth 10 neighbor each other in the circumferential direction, but the member 33 is not interposed between the tooth 10 and the yoke 20 in the circumferential direction. Therefore, the member 33 does not hinder the flow the magnetic fluxes from the tooth 10 to the yoke 20 in the circumferential direction.

Figure 14:
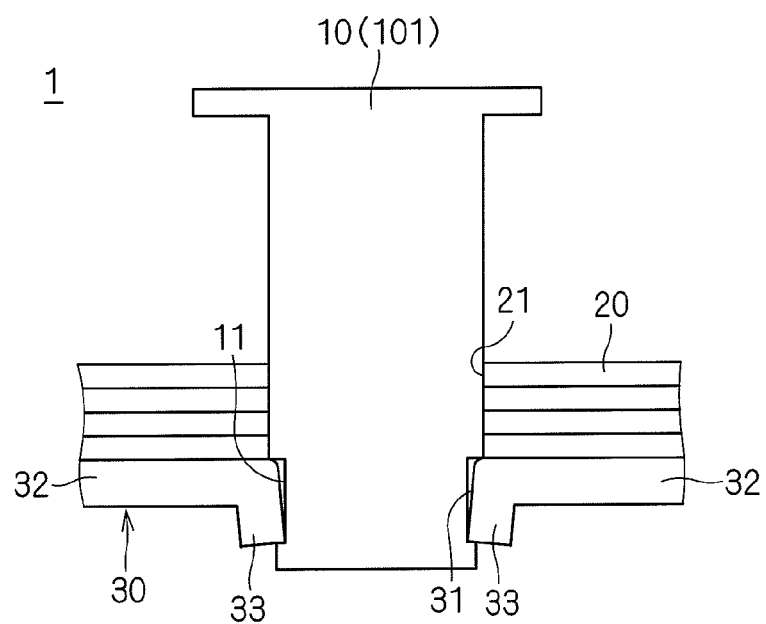
FIG. 14 is a circumferential view showing a conceptual configuration of a part of the armature core.

FIG. 14 shows an exemplary conceptual configuration of the armature core, in a cross-section passing through the tooth and extending along the circumferential direction. The tooth 10 has a recessed portion 11 that opens in a direction (here, the circumferential direction) perpendicular to the rotation axis P.

The reinforcing plate 30 has a press structure that presses the tooth 10 in the direction (here, the circumferential direction) in which the recessed portion 11 opens. In the example shown in FIG. 14, the reinforcing plate 30 includes the members 32 and 33. The members 32 and 33 are identical to the members 32 and 33 described with reference to FIG. 13. The member 33 is engaged with the recessed portion 11 in the circumferential direction. To form such a structure, the tooth 10 is inserted into the hole 31 of the reinforcing plate 30. An end of the tooth 10 at the reinforcing plate 30 side relative to the recessed portion 11 is inserted into the hole 31 while expanding the member 33 toward the member 32 side. As a result, the member 32 is elastically deformed, and further bent. When the recessed portion 11 reaches the position of the member 33 in the axial direction, the expanded member 33 shrinks in the circumferential direction due to elastic recovery, and comes into engagement with the recessed portion 11. Consequently, the tooth 10 and the reinforcing plate 30 are fixed to each other, thus preventing the tooth 10 from escaping out of the reinforcing plate 30.

Figure 15:
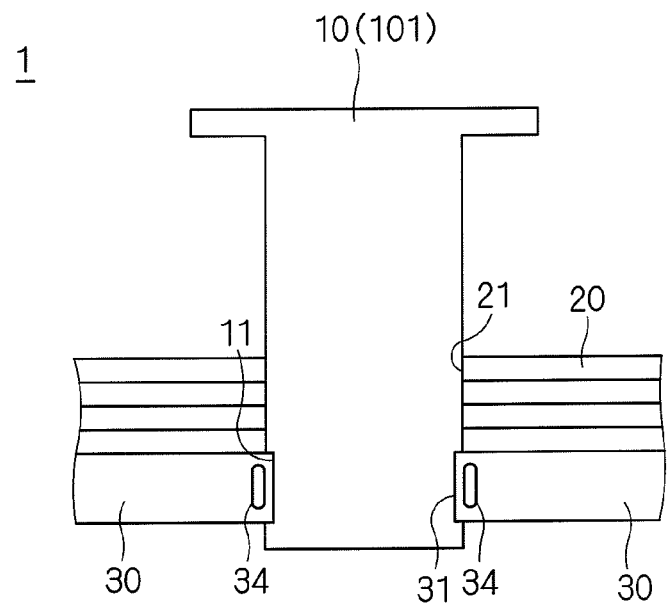
FIG. 15 is a circumferential view showing a conceptual configuration of a part of the armature core.

FIG. 15 shows another exemplary conceptual configuration of the armature core, in a cross-section passing through the tooth and extending along the circumferential direction.

As compared with the armature core shown in FIG. 14, the bias structure is different. The bias structure is implemented by a hole 34 provided in the reinforcing plate 30. A more specific description is as follows.

The tooth 10 is inserted through the hole 31 provided in the reinforcing plate 30, and in the hole 31, the recessed portion 11 is engaged with the reinforcing plate 30 in the circumferential direction. The reinforcing plate 30 has a hole 34 that is adjacent to the hole 31 in the circumferential direction. The holes 31 and 34 are spaced from each other in the circumferential direction. It may be also recognized that the hole 34 is provided in a position adjacent to the recessed portion 11 in the circumferential direction.

In such a reinforcing plate 30, at a position where the hole 34 exists, the axial thickness of the reinforcing plate 30 is reduced by the thickness of the hole 34. Therefore, the strength of a portion neighboring the hole 34 in the axial direction is lowered, thus facilitating elastic deformation of the reinforcing plate 30 in the circumferential direction near the hole 31.

Figure 16:
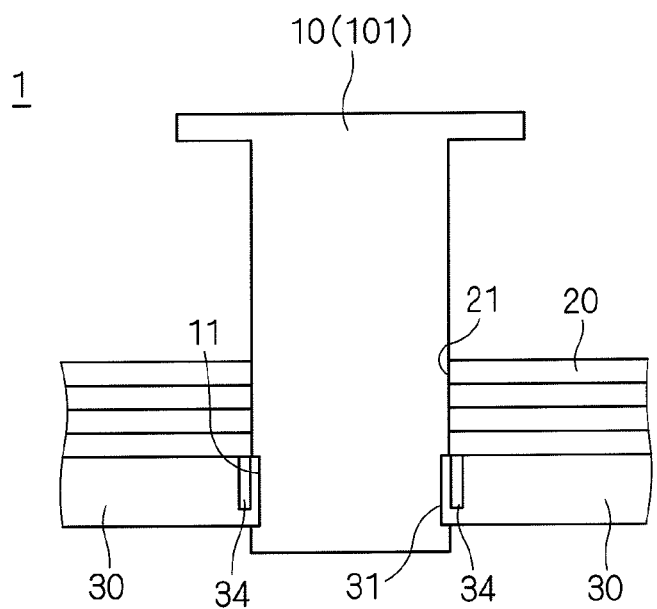
FIG. 16 is a circumferential view showing a conceptual configuration of a part of the armature core.

FIG. 16 shows another exemplary conceptual configuration of the armature core, in a cross-section passing through the tooth and extending along the circumferential direction. As compared with the armature core shown in FIG. 15, the hole 34 opens to one side in the axial direction. In the reinforcing plate 30, a portion located at the tooth 10 side relative to the hole 34 can be simply recognized as a beam having one end thereof supported, and this portion is biased from the outside to the inside of the tooth 10 in the circumferential direction due to elastic deformation of the beam. Also in a portion neighboring the hole 34 in the axial direction, similarly to FIG. 15, elastic deformation in the circumferential direction is easily produced. The opening may be toward the other side in the axial direction.

The bias structure described with reference to FIGS. 14 to 16 may be adopted as a bias structure for absorbing the dimensional error in the stacking direction described with reference to FIGS. 11 to 13.

Third Embodiment

A perspective view showing an exemplary conceptual configuration of a third embodiment is identical to that shown in FIG. 1. In the third embodiment, too, the teeth 10 and the reinforcing plate 30 are fixed to each other in the method described in the first or second embodiment. In this description, an armature core in which the teeth 10 and the reinforcing plate 30 are fixed to each other by welding is taken as an example.

Figure 17:
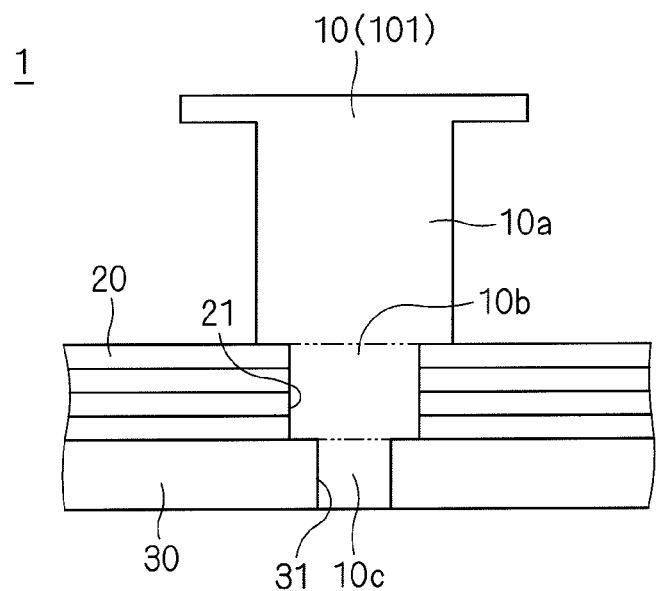
FIG. 17 is a circumferential view showing a conceptual configuration of a part of the armature core.

FIG. 17 shows another exemplary conceptual configuration of the armature core, in a cross-section passing through the tooth and extending along the circumferential direction. The circumferential width of the coil winding portion 10a is larger than the circumferential width of the embedded-in-yoke portion 10b. In other words, the tooth 10 cooperates with the reinforcing plate 30 to interpose the yoke 20 therebetween in the axial direction. Thus, by the tooth 10 and the reinforcing plate 30 being fixed to each other, the yoke 20 interposed between the tooth 10 and the reinforcing plate 30 is also fixed. In other words, the yoke 20 is sandwiched between the tooth 10 and the reinforcing plate 30 in the axial direction. Therefore, it is not necessary to provide a fixing portion dedicated to fixing the yoke 20 to the tooth 10 or to the reinforcing plate 30, and thus the manufacturing cost can be reduced. If the yoke 20 is formed of the magnetic steel sheets 201, the fixing of the tooth 10 and the reinforcing plate 30 to each other can also serve as the fixing of the magnetic steel sheets 201 to one another.

Figure 18:
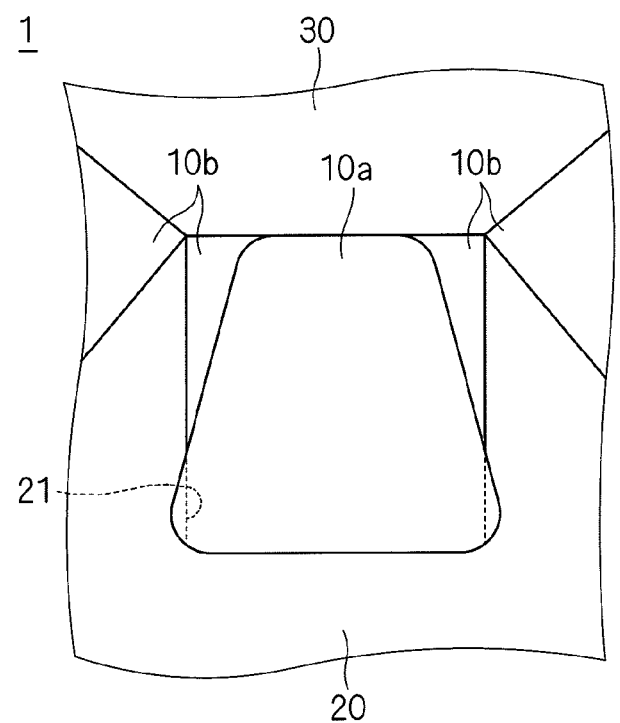
FIG. 18 is a diagram showing a conceptual configuration of a part of the armature core, when seen along the axial direction.

Here, since the tooth 10 and the yoke 20 face each other in the axial direction, the flow of the magnetic fluxes in the tooth 10 crosses the surface of the yoke 20 that is perpendicular to the axial direction. As a result, the flow of the magnetic fluxes is hindered. Therefore, it is desirable that the area of a portion of the tooth 10 that is in contact with the yoke 20 in the axial direction is small. For example, FIG. 18 is a plan view of the armature core 1 shown in FIG. 17, as seen in the axial direction. Here, in FIG. 18, a flange shape of the tooth 10 is not illustrated. In an example shown in FIG. 18, in the coil winding portion 10*a*, only a portion at the lower base side with the maximum circumferential width has a width larger than the width of the embedded-in-yoke portion 10*b*. This can suppress hindrance to the flow of the magnetic fluxes, while the tooth 10 and the reinforcing plate 30 fix the yoke 20 by sandwiching the yoke 20 therebetween in the axial direction.

Fourth Embodiment

Figure 19:
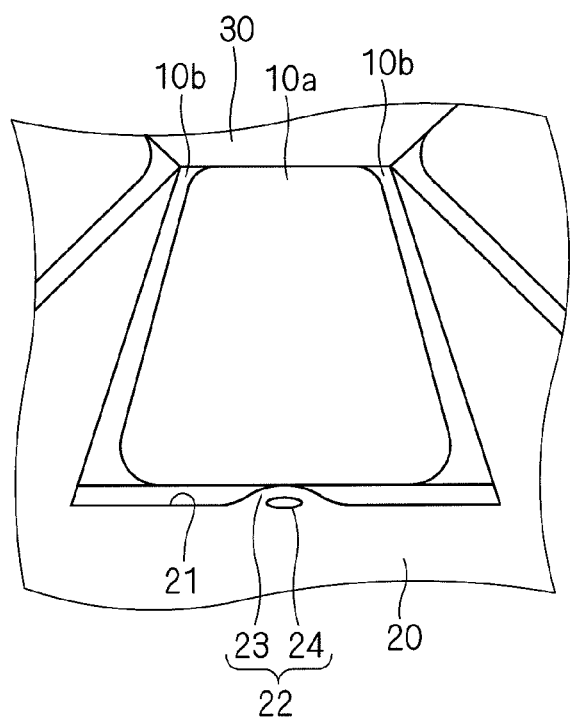
FIG. 19 is a diagram showing a conceptual configuration of a part of the armature core, when seen along the axial direction.

In a fourth embodiment, the shape of the teeth 10 will be described. FIG. 19 shows the shape of a part of the armature core 1, as seen in the axial direction. The embedded-in-yoke portion 10*b* has a substantially trapezoidal shape. In an example shown in FIG. 19, the embedded-in-yoke portion 10*b* is arranged such that the upper base and the lower base of the trapezoidal shape of the embedded-in-yoke portion 10*b* can be in the circumferential direction. The upper base is located at the inner circumferential side relative to the lower base.

The through hole 21 formed in the yoke 20 has a shape that opens in the radial direction and matches with the shape of the embedded-in-yoke portion 10*b*. In the example shown in FIG. 19, the through hole 21 has a shape that opens to the inner circumferential side in the radial direction and extends along the oblique side of the embedded-in-yoke portion 10*b* when seen in the axial direction.

In the embedded-in-yoke portion 10*b* and the through hole 21, by pressing the tooth 10 to the inner circumferential side in the radial direction, the embedded-in-yoke portion 10*b* and the yoke 20 are brought into close contact with each other. Thus, a gap between the tooth 10 and the yoke 20 in the circumferential direction can be reduced, and thus the flow of the magnetic fluxes therebetween is hardly hindered.

In the example shown in FIG. 19, the yoke 20 has a bias structure 22 that biases the tooth 10 from the lower base side of the embedded-in-yoke portion 10*b* to the upper base side thereof. The bias structure 22 is achieved by, for example, an application of the bias structure described with reference to FIGS. 14 to 16. In FIG. 19, the bias structure of FIG. 15 is shown as an example. More specifically, the yoke 20 has a protrusion 23 protruding toward the tooth 10 in the radial direction in the hole 31, and a hole 24 provided within the protrusion. Due to such a bias structure, if the tooth 10 is arranged into the yoke 20 by being inserted therethrough, the tooth 10 is biased to the inner circumferential side in the radial direction, thus reducing the gap between the tooth 10 and the yoke 20 in the circumferential direction.

Fifth Embodiment

Figure 20:
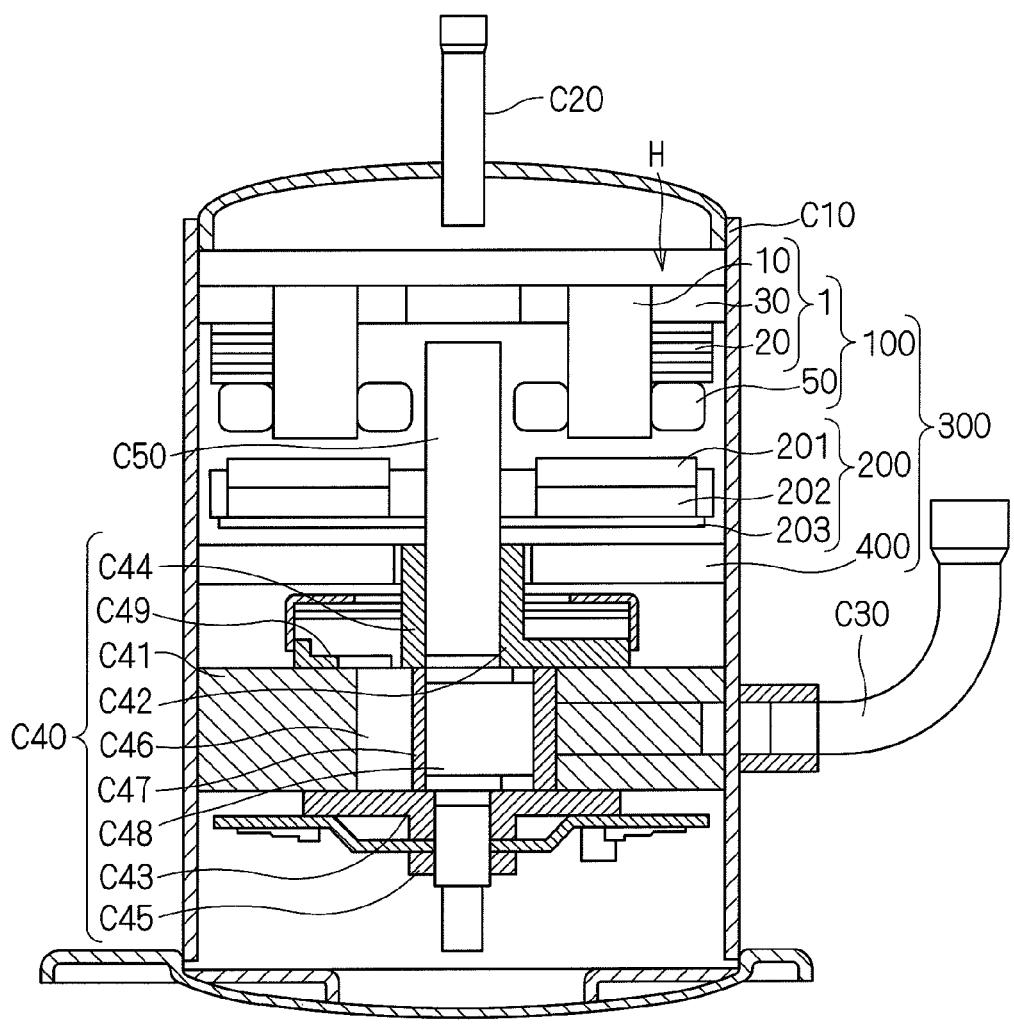
FIG. 20 is a vertical cross-sectional view showing a conceptual configuration of a compressor.

FIG. 20 is a vertical cross-sectional view showing an example of a compressor to which an electric motor including the armature core according to the first to fourth embodiments is applied. A compressor shown in FIG. 20 is a high-pressure dome-type rotary compressor. For example, HFC (hydrofluorocarbon), carbon dioxide, or the like, is adopted as a cooling medium therefor.

The compressor includes a closed container C10, a compressor mechanism C40, and an electric motor 300. The compressor mechanism C40 is arranged within the closed container C10. The electric motor 300 is arranged within the closed container C10 and at the upper side of the compressor mechanism C40. Here, the upper side means the upper side along a central axis of the closed container C10 irrespective of whether or not the central axis of the closed container C10 is inclined relative to a horizontal plane.

The electric motor 300 drives the compressor mechanism C40 through a rotation axis shaft C50. The electric motor 300 includes an armature 100 having the armature core 1 described in any of the first to fourth embodiments and the coil 50, a field element 200, and a stator 400 having no coil. The armature 100 is fixed to the closed container C10 and functions as a stator, and the field element 200 is fixed to a rotating shaft C50 and functions as a rotor.

The field element 200 includes field magnets 202, magnetic bodies 201, and a magnetic body 203. The field magnets 202 are arranged annularly around the shaft C50. The magnetic bodies 201 are arranged so as to be overlaid on the field magnet 202 in the axial direction at the armature 100 side. The magnetic body 201 reduces a loss caused by eddy currents and a demagnetization of the field magnet 202. The magnetic body 203 is arranged so as to be overlaid on the field magnets 202 in the axial direction at the side opposite to the magnetic bodies 201. The magnetic body 203 is continuous in the circumferential direction. The magnetic body 203 short-circuits part of the magnetic fluxes between the field magnets 202 neighboring in the circumferential direction, and thereby reduces a thrust force acting on the field element 200 in the axial direction.

The stator 400 is arranged with a predetermined gap at the side of the field element 200 opposite to the armature 100, and fixed to the closed container C10. The stator 400 functions as a yoke of the field element 200 for reducing a thrust force acting on the electric motor 300 in the axial direction.

An inlet pipe C30 is connected to a side of a lower portion of the closed container C10, and an outlet pipe C20 is connected to an upper portion of the closed container C10. A cooling medium gas (not shown) is supplied through the inlet pipe C30 to the closed container C10, and guided to a suction side of the compressor mechanism C40. This rotary compressor is a vertical type, and has an oil reservoir at least at a lower side of the electric motor 300.

A high-pressure region H is defined within the closed container C10, and the high-pressure region H is filled with a high-pressure-cooling medium gas discharged from the compressor mechanism C40. The electric motor 300 is arranged in the high-pressure region H.

An outer circumferential edge of the reinforcing plate 30 is located at the outer circumferential side than the yoke 20 when seen from the rotating shaft C50, and fixed to the closed container C10. In other words, the reinforcing plate 30 is fixed to the closed container C10 from the outer side when seen from the rotation axis P. For example, the reinforcing plate 30 and the closed container C10 are fixed to each other by interference fitting (for example, shrink-fitting). Since such fixing does not require the yoke 20 to be fixed to the closed container C10, a stress caused by fixing of the armature core 1 to the closed container C10 does not easily occur in the yoke 20. Therefore, a deterioration in the magnetic characteristics of the yoke 20 can be suppressed.

The reinforcing plate 30 may extend in the axial direction at the outer circumferential side of the yoke 20. That is, the reinforcing plate 30 is shaped into a cup so as to partially or wholly cover the yoke 20 from the outer circumference thereof. This can increase the contact area between the reinforcing plate 30 and the closed container C10, thus improving the fixing force produced by the interference fitting.

The compressor mechanism C40 includes a cylindrical main body C41, an upper edge plate C42, and a lower edge plate C45. The upper edge plate C42 and the lower edge plate C45 are mounted to upper and lower opening ends of the main body C41, respectively. The rotating shaft C50 extends through the upper edge plate C42 and the lower edge plate C45, and is inserted within the main body C41. The rotation axis shaft C50 is rotatably supported by a bearing C44 provided to the upper edge plate C42 and a bearing C43 provided to the lower edge plate C45.

The rotation axis C50 has a crankpin C47 within the main body C41. A piston C48 is driven in engagement with the crankpin C47. A compression chamber C46 is formed between the piston C48 and a cylinder corresponding thereto. The piston C48 rotates or revolves while being decentered, to change the volume of the compression chamber C46.

Next, an operation of the above-mentioned rotary compressor will be described. A cooling medium gas is supplied through the inlet pipe C30 to the compression chamber C46. The electric motor 300 drives the compressor mechanism C40 to compress the cooling medium gas. The compressed cooling medium gas is, together with a refrigerant oil (not shown), transported from the compressor mechanism C40 to the upper side of the compressor mechanism C40 through an outlet hole C49, further passes through the electric motor 300, and is discharged to the outside of the closed container C10 through the outlet pipe C20.

The cooling medium gas as well as the refrigerant oil moves upward within the electric motor 300. The cooling medium gas is guided to the upper side of the electric motor 300, while the refrigerant oil moves to an inner wall of the closed container C10 due to a centrifugal force produced by the field element 200. The refrigerant oil in a state of fine particles adheres to the inner wall of the closed container C10 to be thereby liquefied, and then, due to the action of gravity, returns to an upstream of the flow of the cooling medium gas in the electric motor 300.

Figure 21:
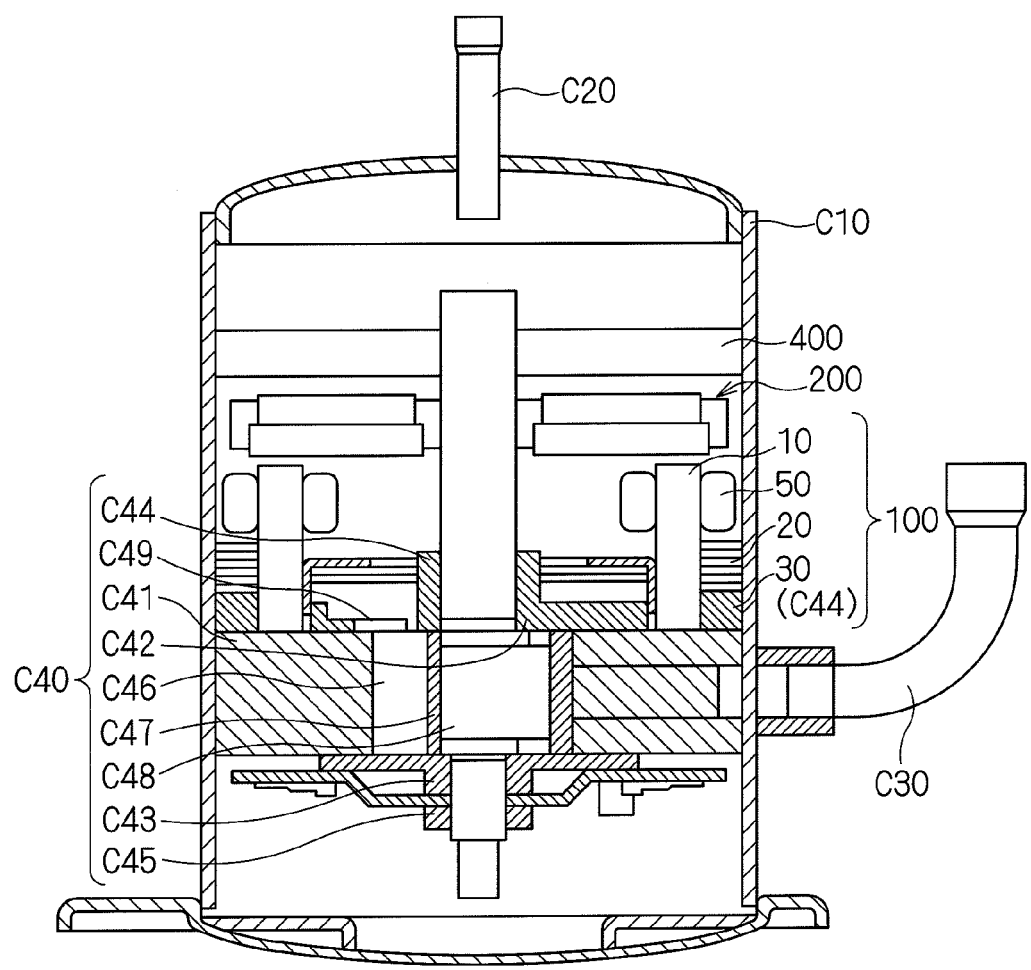
FIG. 21 is a vertical cross-sectional view showing a conceptual configuration of a compressor.

FIG. 21 is a vertical cross-sectional view showing another example of a compressor to which an electric motor including the armature core according to the first to fourth embodiments is applied.

In FIG. 21, the armature is positioned at the compressor mechanism C40 side of the field element 200.

The reinforcing plate 30 forms a part of the compressor mechanism C40. In the example shown in FIG. 21, the reinforcing plate 30 has a function of the upper edge plate C42. In other words, the teeth 10 are fixed to the upper edge plate C42. For example, the teeth 10 are metallurgically or mechanically fixed. This fixing can be implemented by any of the methods described in the first to the fourth embodiments. For example, the fixing is achieved by interference fitting with the upper edge plate C42.

Since the reinforcing plate 30 and the upper edge plate C42 are implemented by a single member, it is not necessary to use a dedicated reinforcing plate 30 or a dedicated upper edge plate C42. Therefore, the manufacturing cost can be reduced. The reinforcing plate 30 may have the function of the main body C41. More specifically, the teeth 10 may be metallurgically or mechanically fixed to the main body C41. In such a case as well, the manufacturing cost can be reduced.

While the invention has been described in detail, the foregoing description is in all aspects illustrative and the present invention is not limited thereto. It will be appreciated that numerous modifications not illustrated herein can be made without departing from the scope of the present invention.

DESCRIPTION OF THE REFERENCE NUMERALS 10 teeth
11 recessed portion
20 yoke
21 through hole
30 reinforcing plate
31, 34 hole
33 member
101, 201 magnetic steel sheet

The invention claimed is:

1. An armature core comprising:
a plurality of teeth arranged annularly around a predetermined axis;
a yoke having a plurality of through holes that open in a radial direction around said axis and an axial direction along said axis, and through which said plurality of teeth are inserted, said yoke being formed of a plurality of magnetic steel sheets stacked in said axial direction or formed of a dust core; and
a metal plate arranged to face said yoke in said axial direction and fixed to said plurality of teeth, wherein
an outer shape of the yoke is surrounded by an outer shape of the metal plate when seen from the axial direction, and
the outer shape of the yoke and the outer shape of the metal plate extend in a non-overlapping manner along the axial direction.

2. The armature core according to claim 1, wherein each of said plurality of teeth has a plurality of magnetic bodies stacked in a direction perpendicular to said axis.

3. The armature core according to claim 1, wherein said metal plate is non-magnetic.

4. The armature core according to claim 3, wherein said metal plate is made of stainless steel.

5. The armature core according to claim 1, wherein said plurality of teeth and said metal plate are welded to each other, only at an end of said plurality of teeth in the radial direction around said axis.

6. The armature core according to claim 1, wherein at least one of said plurality of teeth and said metal plate are welded to each other over an entire circumference of said at least one of said plurality of teeth, when seen along said axis.

7. The armature core according to claim 1, wherein at least one of said plurality of teeth has a plurality of magnetic plates stacked in a direction perpendicular to said axis, and said at least one of said plurality of teeth and said metal plate are welded to each other at a portion between adjacent two of said plurality of magnetic plates.

8. The armature core according to claim 1, wherein at least one of said plurality of teeth cooperates with said metal plate to interpose said yoke therebetween in said axial direction.

9. The armature core according to claim 1, wherein said plurality of teeth comprise dust cores containing insulating materials, said metal plate is formed of a sintered metal, and said plurality of teeth and said metal plate are sinter-bonded to each other.

10. The armature core according to claim 1, wherein an outer circumferential edge of said metal plate is located at an outer side of said yoke when seen from said axis, and said metal plate is fixed to a predetermined casing from outside.

11. The armature core according to claim 1, wherein said metal plate forms a part of a compressor mechanism.

12. The armature core according to claim 1, wherein said metal plate has a hole allowing at least one of said plurality of teeth to be inserted therein in said axial direction.

13. An armature core comprising:

a plurality of teeth arranged annularly around a predetermined axis;

a yoke having a plurality of through holes that open in a radial direction around said axis and an axial direction along said axis, and through which said plurality of teeth are inserted, said yoke being formed of a plurality of magnetic steel sheets stacked in said axial direction or formed of a dust core; and a metal plate arranged to face said yoke in said axial direction and fixed to said plurality of teeth, wherein at least one of said plurality of teeth has a plurality of magnetic bodies stacked in a direction perpendicular to said axis, said metal plate has a hole and a bias structure provided at a periphery of said hole, said hole allowing said at least one of said plurality of teeth to be insert therein in said axial direction, said bias structure biasing said at least one of said plurality of teeth from outside to inside thereof in a direction of stacking of said plurality of magnetic bodies.

14. An armature core comprising:

a plurality of teeth arranged annularly around a predetermined axis;

a yoke having a plurality of through holes that open in a radial direction around said axis and an axial direction along said axis, and through which said plurality of teeth are inserted, said yoke being formed of a plurality of magnetic steel sheets stacked in said axial direction or formed of a dust core; and a metal plate arranged to face said yoke in said axial direction and fixed to said plurality of teeth, wherein at least one of said plurality of teeth has a recessed portion that opens in a direction perpendicular to said axis, said metal plate has a hole and a bias structure, said hole allowing said at least one of said plurality of teeth to be inserted therein in said axial direction, said bias structure biasing said at least one of said plurality of teeth from outside to inside thereof in said direction to bring said at least one of said plurality of teeth into engagement with said recessed portion.

* * * * *